(12) United States Patent
Shirasawa (10) Patent No.: US 12,502,505 B2
(45) Date of Patent: Dec. 23, 2025

(54) SLEEP INDUCTION DEVICE, OPERATION METHOD FOR RESPIRATORY RHYTHM ADJUSTMENT DEVICE, AND COMPUTER READABLE RECORDING MEDIUM

(71) Applicant: Ayumu Shirasawa, Tokyo (JP)

(72) Inventor: Ayumu Shirasawa, Tokyo (JP)

( * ) Notice: Subject to any disclaimer, the term of this patent is extended or adjusted under 35 U.S.C. 154(b) by 806 days.

(21) Appl. No.: 17/885,129

(22) Filed: Aug. 10, 2022

(65) Prior Publication Data

US 2022/0379073 A1  Dec. 1, 2022

Related U.S. Application Data

(63) Continuation of application No. PCT/JP2021/003705, filed on Feb. 2, 2021.

(30) Foreign Application Priority Data

Feb. 13, 2020 (JP) .................................. 2020-022890
Oct. 7, 2020 (JP) .................................. 2020-170176

(51) Int. Cl.
*A61M 21/02* (2006.01)
*A61B 5/00* (2006.01)
(Continued)

(52) U.S. Cl.
CPC ........... *A61M 21/02* (2013.01); *A61B 5/4809* (2013.01); *A61M 2021/0022* (2013.01);
(Continued)

(58) Field of Classification Search
CPC .......... A61M 21/02; A61M 2021/0022; A61M 2021/0055; A61M 2205/502;
(Continued)

(56) References Cited

U.S. PATENT DOCUMENTS

2014/0179986 A1* 6/2014 Kelley ................. A61B 5/4806
                                                             600/26
2017/0319815 A1   11/2017 Nofzinger et al.
2018/0177975 A1*  6/2018 Goto .................... A61B 5/4818

FOREIGN PATENT DOCUMENTS

EP      3 606 589 B1   2/2021
JP      2014-176475 A  9/2014
(Continued)

OTHER PUBLICATIONS

Extended European Search Report for European Application No. 21753323.1, dated Feb. 29, 2024.
(Continued)

*Primary Examiner* — Carrie R Dorna
*Assistant Examiner* — Joshua Daryl D Lannu (57) ABSTRACT

A sleep induction device, wherein the control unit reads a stimulation rate that is associated with a stimulation part from a storage unit, calculates a stimulation candidate by making a shift in the stimulation rate by a predetermined amount, outputs a drive signal according to the stimulation candidate, acquires a detection time from start of output of the drive signal to detection of sleep onset by the sensor, and causes the storage unit to store the stimulation candidate and the detection time as the stimulation rate and a sleep induction time, in association with the stimulation part, when the detection time is shorter than the sleep induction time.

2 Claims, 11 Drawing Sheets

(51) Int. Cl.
  *A61F 7/00*     (2006.01)
  *A61M 21/00*    (2006.01)
  *G16H 20/30*    (2018.01)
  *G16H 20/70*    (2018.01)
  *G16H 40/63*    (2018.01)
  *G16H 50/20*    (2018.01)

(52) U.S. Cl.
  CPC ............... *A61M 2021/0055* (2013.01); *A61M 2205/502* (2013.01); *A61M 2205/52* (2013.01)

(58) Field of Classification Search
  CPC ........ A61M 2205/52; A61M 2209/088; A61B 5/4809; A61B 5/4806; A61F 7/007; A61F 2007/0078; A61F 2007/0093; G16H 20/30; G16H 20/70; G16H 40/63; G16H 50/20
  See application file for complete search history.

(56) References Cited

FOREIGN PATENT DOCUMENTS

| JP | 2016-43189 A | 4/2016 |
| JP | 2019-51065 A | 4/2019 |
| WO | WO 2018/186739 A1 | 10/2018 |

OTHER PUBLICATIONS

International Search Report for PCT/JP2021/003705 mailed on Mar. 2, 2021.

\* cited by examiner

SLEEP INDUCTION DEVICE, OPERATION METHOD FOR RESPIRATORY RHYTHM ADJUSTMENT DEVICE, AND COMPUTER READABLE RECORDING MEDIUM

CROSS REFERENCE TO RELATED APPLICATION

This application is a continuation application of PCT/JP2021/003705 filed on Feb. 2, 2021 and claims benefit of Japanese Applications No. 2020-022890 filed on Feb. 13, 2020 in Japan and No. 2020-170176 filed on Oct. 7, 2020 in Japan, the entire contents of which are incorporated herein by this reference.

BACKGROUND

The present invention relates to a sleep induction device, an operation method of the respiratory rhythm adjustment device, and a computer readable recording medium.

Conventionally, there are disclosed sleep induction devices for applying cyclical stimulation to a user to induce sleep in the user. For example, Japanese Patent Laid-Open No. 2014-176475 discloses a sleep assisting tool that is a pseudo-pulsing body to be held against chest or to be held in hand, the sleep assisting tool including a vibration unit for generating pseudo pulses by sucking, by an electromagnetic coil, a weight supported by a vibration plate, and a control unit for controlling the vibration unit through operation of a start switch.

Furthermore, Japanese Patent Laid-Open No. 2019-51065 discloses bedding and a communication system, where measurement is performed for a sleep induction time of a user every day for a predetermined number of days while changing, every day by a predetermined algorithm such as hill climbing, the number of vibrations of a pillow that is caused to vibrate by a vibration unit, and determines the number of vibrations of the pillow when the measured sleep induction time takes a minimal value to be an optimal number of vibrations.

SUMMARY

A sleep induction device of one aspect of the present invention includes:

an instruction input device for allowing a user to input an instruction regarding a stimulation part that is desired;

an attachment unit for being attached to the stimulation part of the user; and a drive device provided continuously to the attachment unit and including a control unit for reading a stimulation rate that is associated with the stimulation part from a storage unit and for cyclically outputting a drive signal that is according to the stimulation rate, a stimulation application unit for generating stimulation according to the drive signal and for applying the stimulation to the user, and a sensor for detecting sleep onset in the user, where the storage unit stores the stimulation part, and the stimulation rate and a sleep induction time that are associated with the stimulation part, and the control unit reads the stimulation rate that is associated with the stimulation part from the storage unit, calculates a stimulation candidate by making a shift in the stimulation rate by a predetermined amount, outputs the drive signal according to the stimulation candidate, acquires a detection time from start of output of the drive signal to detection of the sleep onset by the sensor, and causes the storage unit to store the stimulation candidate and the detection time as the stimulation rate and the sleep induction time, in association with the stimulation part, when the detection time is shorter than the sleep induction time.

DETAILED DESCRIPTION

Hereinafter, embodiments will be described with reference to the drawings.

Configuration of First Embodiment

Figure 1:
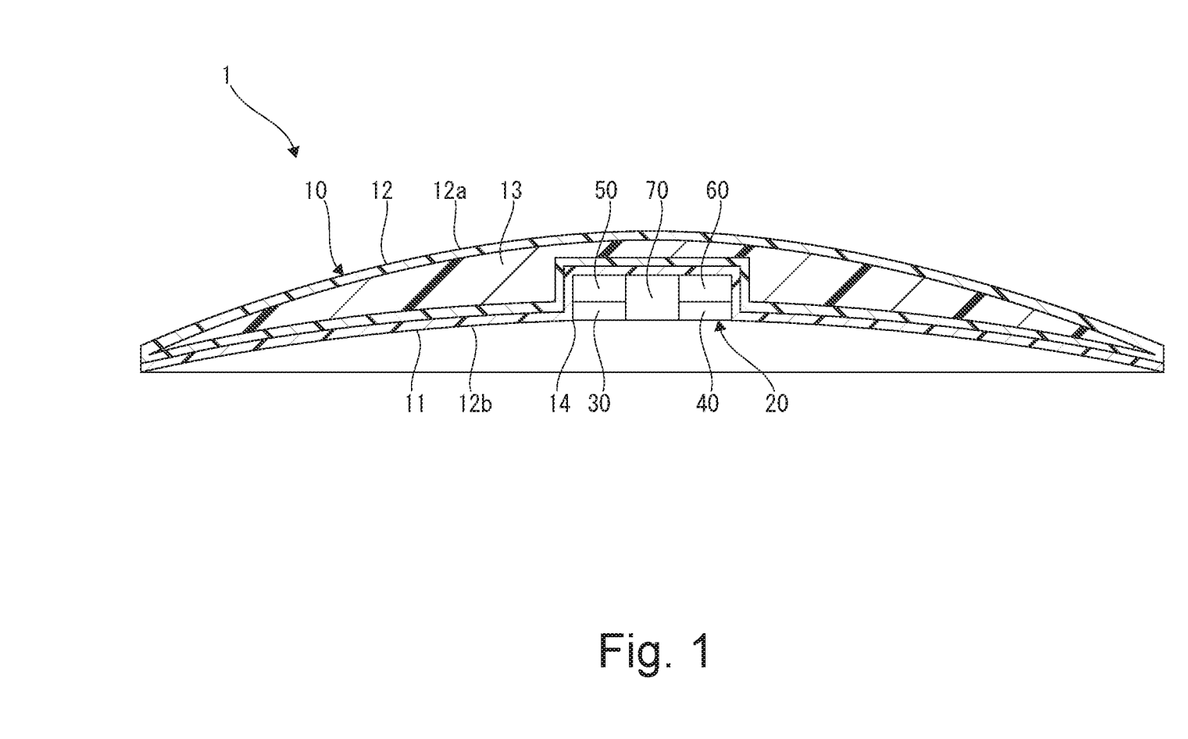
FIG. 1 is a cross-sectional view of a center portion of a sleep induction device according to a first embodiment taken along a thickness direction.
Figure 2:
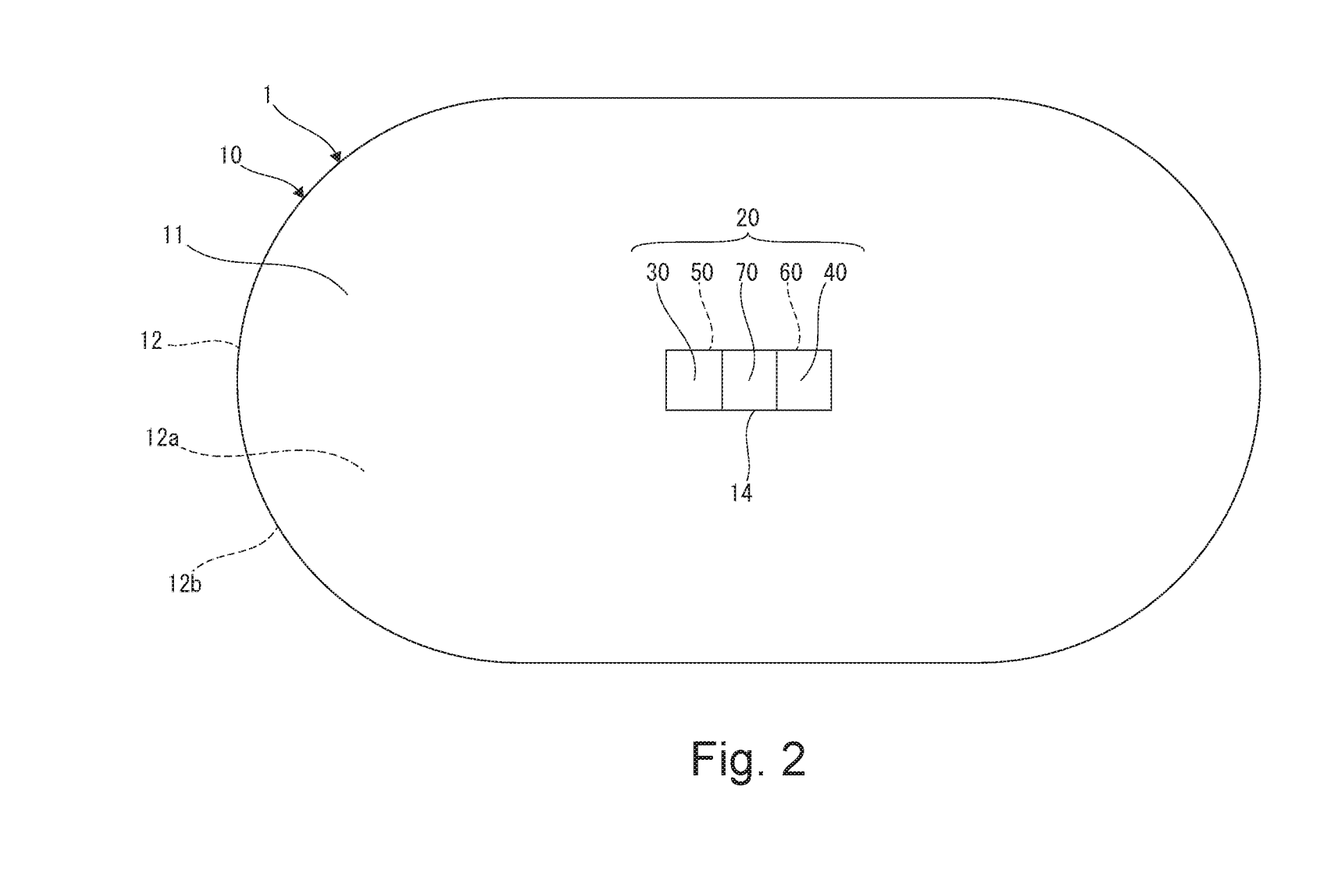
FIG. 2 is a bottom view showing an example of an external configuration of the sleep induction device according to the first embodiment.

FIG. 1 is a cross-sectional view of a center portion of a sleep induction device 1 taken along a thickness direction. FIG. 2 is a bottom view showing an example of an external configuration of the sleep induction device 1.

Figure 4:
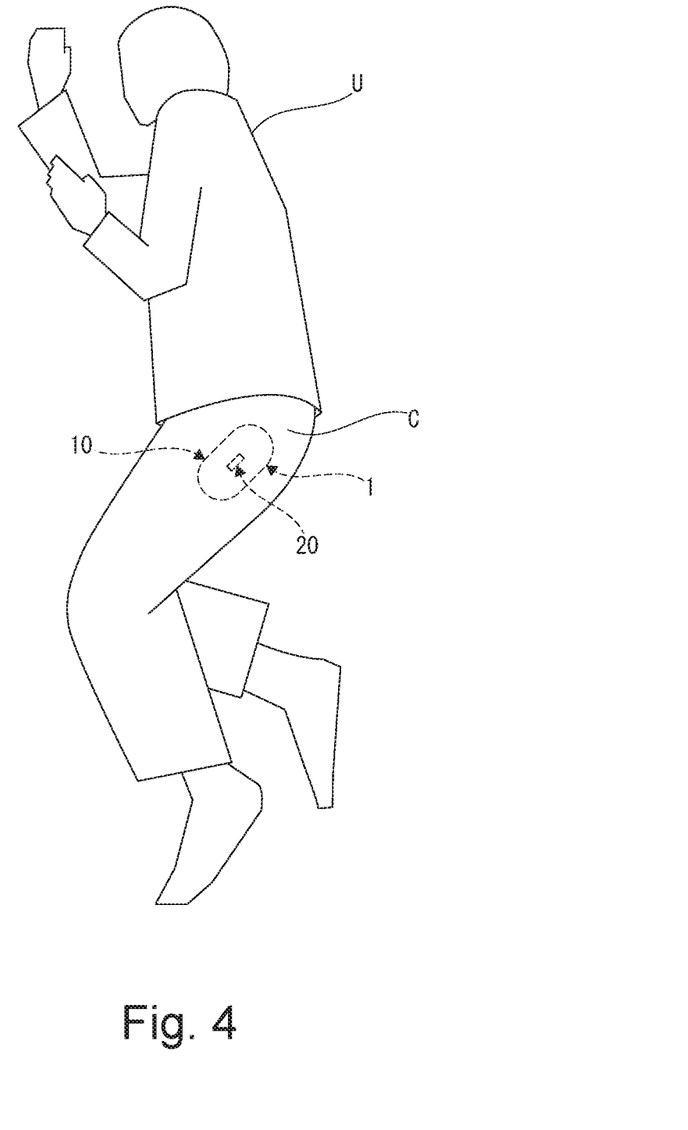
FIG. 4 is an explanatory diagram for describing an action of the sleep induction device according to the first embodiment.

The sleep induction device 1 is a wearable device that is used by being attached to a user U (FIG. 4). The sleep induction device 1 includes an attachment unit 10 and a drive device 20.

The attachment unit 10 includes an adhesive 11, a bag 12, a filling member 13, and a housing unit 14.

For example, the adhesive 11 is silicon-based pressure-sensitive adhesive (PSA), and is attachable to skin of the user U. The attachment unit 10 is not easily moved when attached to the skin of the user U by the adhesive 11, and the attachment unit 10 may maintain adhesive force even after being peeled off and can be repeatedly used.

The bag 12 is formed from a material such as flexible resin. As shown in FIG. 2, the bag 12 has an oval outer periphery, but this is not restrictive. The bag 12 is formed from a sheet 12b as a first sheet and a sheet 12a as a second sheet that are disposed facing each other and that are bonded at peripheral portions by thermal welding, and the adhesive 11 is held on an outer surface of the sheet 12b. The sheet 12b desirably has a round surface shape that fits a shape of an attachment part of the user U. More desirably, the first sheet has a round surface shape that is recessed to fit a shape of a back, a buttock or a thigh of the user U. The sheet 12a has a bulging shape that bulges in an opposite direction from the sheet 12b.

The filling member 13 fills the bag 12. For example, the filling member 13 is a gel such as a silicon gel or a hydro gel, but the filling member 13 is not limited thereto, and may be a flexible plastic, rubber, a fabric, a liquid or the like.

The housing unit 14 is provided at a center of the sheet 12b in a recessed manner, and the housing unit 14 houses the drive device 20.

Figure 3:
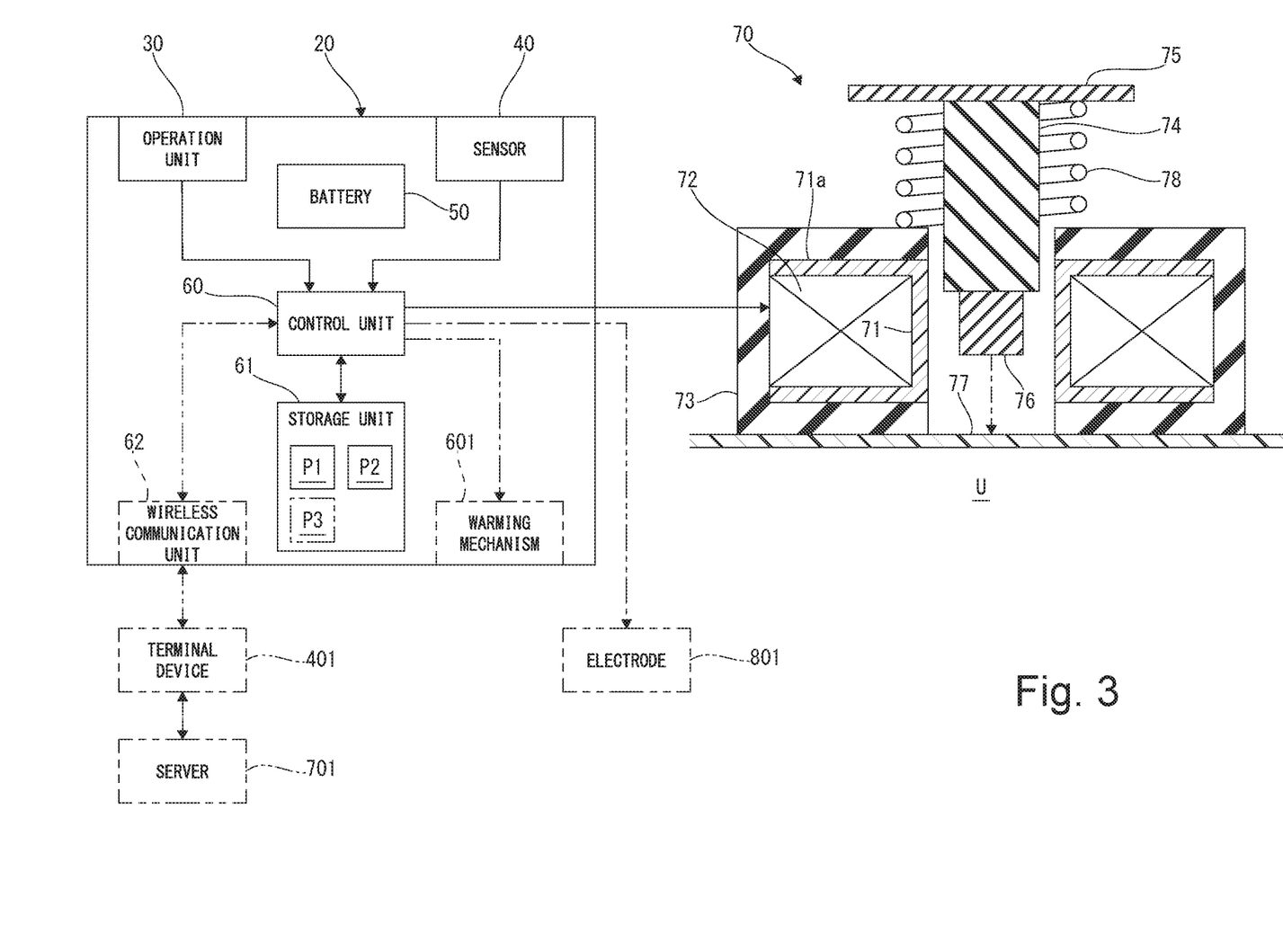
FIG. 3 is an explanatory diagram for describing an example of an internal configuration of the sleep induction device according to the first embodiment.

FIG. 3 is an explanatory diagram for describing an example of an internal configuration of the sleep induction device 1.

The drive device 20 is housed inside the housing unit 14, and the drive device 20 applies stimulation to the user U at a regular rhythm that is slow and suitable for sleep onset. The drive device 20 includes an operation unit 30, a sensor 40, a battery 50, a control unit 60, and a stimulation application unit 70.

For example, the operation unit 30 includes a push button for allowing input of an instruction, for example. The operation unit 30 is connected to the control unit 60, and the operation unit 30 outputs an instruction input by the user U, to the control unit 60.

The sensor 40 detects sleep onset in the user U. For example, the sensor 40 is an optical pulse wave sensor, and the sensor 40 emits green wavelength light, acquires a captured image capturing reflected light, measures a heart rate based on the captured image, detects sleep onset based on the heart rate, and outputs a detection signal to the control unit 60.

The battery 50 supplies power to the sensor 40, the control unit 60, and the stimulation application unit 70.

The control unit 60 includes a processing unit such as a CPU. Functions of the control unit 60 are implemented by the processing unit reading programs stored in a storage unit 61 and executing the same.

The storage unit 61 is a memory device such as a ROM, a RAM, or a non-volatile memory. The storage unit 61 stores a program of a drive unit P1 for performing a drive process, a program of a stimulation determination unit P2 for performing a stimulation determination process, and a stimulation rate and a sleep induction time associated with the stimulation rate.

The drive process and the stimulation determination process are ended after a lapse of a drive time from the start. The drive time is not particularly specified, but is desirably set in advance between 5 or more minutes and less than 60 minutes.

The drive unit P1 drives the stimulation application unit 70 by cyclically outputting a drive signal that is according to the stimulation rate stored in the storage unit 61. The stimulation rate is determined by the stimulation determination unit P2. An initial value of the stimulation rate is 67 bpm, for example.

The stimulation determination unit P2 determines the stimulation rate in such a way that contact stimulation at a regular rhythm may be applied to the user U at a regular rhythm that is slow and suitable for sleep onset, and causes the storage unit 61 to store the stimulation rate and the sleep induction time in association with each other. More specifically, the stimulation determination unit P2 outputs the drive signal according to a stimulation candidate that is shifted by a predetermined amount from stimulation information stored in the storage unit 61, acquires a detection time from start of output of the drive signal to detection of sleep onset by the sensor 40, and causes the storage unit 61 to store the stimulation candidate and the detection time detected by outputting the drive signal according to the stimulation candidate, as the stimulation information and the sleep induction time that is associated with the stimulation information, when the detection time is shorter than the sleep induction time. The predetermined amount is set empirically or experimentally such that a more optimal stimulation rate may be determined.

The stimulation application unit 70 generates stimulation according to the drive signal, and applies the stimulation to the user U. The stimulation application unit 70 includes a cylindrical body 71, a coil 72, a yoke 73, a plunger 74, a flange 75, an impactor 76, an impact plate 77, and a compression spring 78. The cylindrical body 71 is formed from a material such as resin, and includes a flange-shaped portion 71a for guiding the coil 72 on each end portion. The coil 72 is wound around the cylindrical body 71, and is connected to the control unit 60. The yoke 73 is formed from a material such as iron, and has a short cylindrical shape that has an opening at a center on each end surface and houses the cylindrical body 71 around which the coil 72 is wound. The plunger 74 is formed from a material such as iron, and has a columnar shape where the flange 75 is provided on one side and the impactor 76 is provided on other side. The flange 75 engages the compression spring 78. The impactor 76 applies impact to the impact plate 77. The impact plate 77 applies contact stimulation according to the impact to the user U. The compression spring 78 is interposed between the flange 75 and the yoke 73 on a radially outer side of the plunger 74 to bias the flange 75 in one direction.

That is, the stimulation rate constructs the stimulation information.

The sleep induction device 1 includes the attachment unit 10 and the drive device 20. The attachment unit 10 is attached to the user U. The drive device 20 includes the control unit 60 for cyclically outputting a drive signal that is according to the stimulation information stored in the storage unit 61, the stimulation application unit 70 for generating stimulation according to the drive signal and for applying the stimulation to the user U, and the battery 50 for supplying power to the control unit 60 and the stimulation application unit 70, and the drive device 20 is provided continuously to the attachment unit 10.

Furthermore, a sleep induction method is achieved by preparing the attachment unit 10 for being attached to the user U, the drive device 20 provided continuously to the attachment unit 10 and including the control unit 60 for cyclically outputting a drive signal that is according to the stimulation information stored in the storage unit 61, the stimulation application unit 70 for generating stimulation according to the drive signal and for applying the stimulation to the user U, and the battery 50 for supplying power to the control unit 60 and the stimulation application unit 70, and the sensor 40 for detecting sleep onset in the user U, where the storage unit 61 stores the stimulation information and the sleep induction time that is associated with the stimulation information, and the control unit 60 outputs the drive signal according to a stimulation candidate that is shifted by a predetermined amount from the stimulation information stored in the storage unit 61, acquires the detection time from start of output of the drive signal to detection of sleep onset by the sensor 40, and causes the storage unit 61 to store the stimulation candidate and the detection time detected by outputting the drive signal according to the stimulation candidate, as the stimulation information and the sleep induction time that is associated with the stimulation information, when the detection time is shorter than the sleep induction time.

Moreover, a sleep induction program causes a computer to execute a program for outputting the drive signal according to a stimulation candidate that is shifted by a predetermined amount from the stimulation information stored in the storage unit 61, a program for acquiring the detection time from start of output of the drive signal to detection of sleep onset by the sensor 40, and a program for causing the storage unit 61 to store the stimulation candidate and the detection time detected by outputting the drive signal according to the stimulation candidate, as the stimulation information and the sleep induction time that is associated with the stimulation information, when the detection time is shorter than the sleep induction time.

(Action)

Next, an action of the sleep induction device 1 will be described. FIG. 4 is an explanatory diagram for describing an action of the sleep induction device 1.

After inputting an instruction to start driving through the operation unit 30, the user U attaches the sleep induction device 1 at a desired part on skin inside clothes using the attachment unit 10. The desired part is not particularly specified, but is desirably a body trunk such as back, a buttock or a thigh, or a part close to the body trunk, for example. A broken line in FIG. 4 indicates an example where the sleep induction device 1 is attached to a buttock of the user U, inside trousers C.

When there is an input of the instruction to start driving, the control unit 60 starts the drive process, and reads the stimulation rate from the storage unit 61 and cyclically outputs the drive signal according to the stimulation rate. More specifically, the control unit 60 outputs, according to the stimulation rate, a drive signal where an H level and an L level are alternately repeated, to the stimulation application unit 70.

At the stimulation application unit 70, when there is an input of the drive signal at the H level, the plunger 74 moves to the other side against a biasing force of the compression spring 78, due to a suction force generated by the coil 72, and the impactor 76 applies impact to the impact plate 77 and the impact plate 77 transmits contact stimulation according to the impact, to the user U. Furthermore, the impact from the impact plate 77 is also transmitted to the attachment unit 10, and the attachment unit 10 also transmits the contact stimulation according to the impact, to the user U.

When there is an input of the drive signal at the L level, the plunger 74 moves to the one side due to the biasing force of the compression spring 78.

Figure 5:
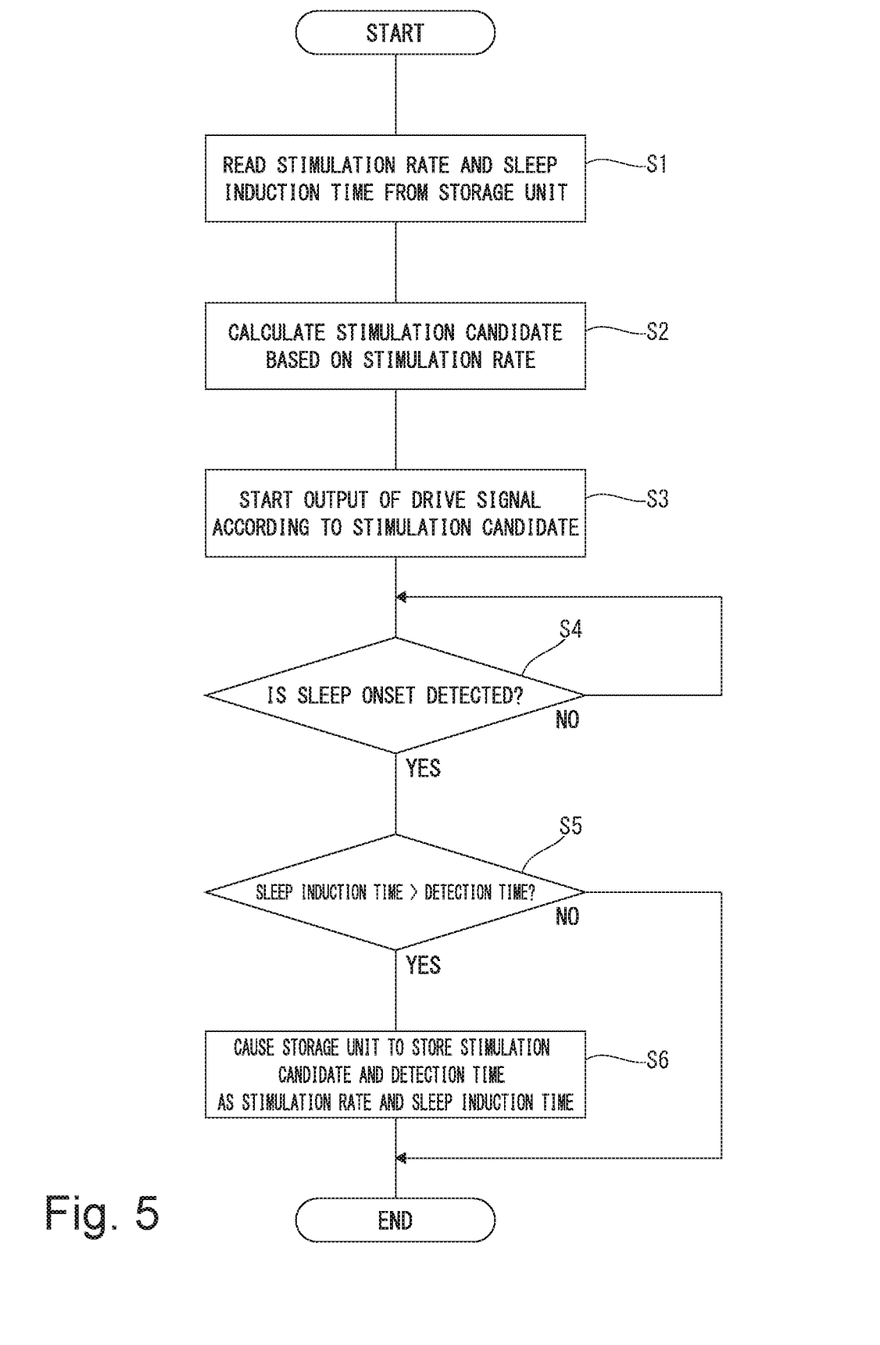
FIG. 5 is a flowchart showing an example of a flow of a stimulation determination process by the sleep induction device according to the first embodiment.

Next, the stimulation determination process will be described. FIG. 5 is a flowchart showing an example of a flow of the stimulation determination process.

When a predetermined condition is satisfied, the control unit 60 performs the stimulation determination process instead of the drive process. At the time of initial driving, after driving is performed a predetermined number of times, after a lapse of a drive time, or the like, are set empirically or experimentally as the predetermined condition, for example, such that a more optimal stimulation rate may be determined by the stimulation determination process.

The control unit 60 reads, from the storage unit 61, the stimulation rate and the sleep induction time that is associated with the simulation rate (S1).

The control unit 60 calculates, based on the stimulation rate, a stimulation candidate that is shifted from the stimulation rate by a predetermined amount (S2). For example, when the stimulation rate that is read in S1 is 67 bpm, the control unit 60 determines the stimulation candidate to be 68 bpm by making a shift of 1 bpm that is the predetermined amount.

The control unit 60 starts cyclical output of the drive signal according to the stimulation candidate determined in S2.

The control unit 60 waits until sleep onset is detected, while outputting the drive signal (S4: NO). When sleep onset is detected by measuring a heart rate of the user U, the sensor 40 outputs a detection signal to the control unit 60. When the detection signal is input (S4: YES), the process proceeds to S5.

In S5, the control unit 60 acquires the sleep induction time that is read in S1, and a detection time from start of output of the drive signal to input of the detection signal. When the detection time is shorter than the sleep induction time (S5: YES), the process proceeds to S6. When the detection time is not shorter than the sleep induction time (S5: NO), the process is ended.

In S6, the control unit 60 causes the storage unit 61 to store the stimulation candidate and the detection time detected by outputting the drive signal according to the stimulation candidate, as the stimulation rate and the sleep induction time that is associated with the stimulation rate.

A stimulation rate more suitable for the user U is stored in the storage unit 61 by the stimulation determination process of S1 to S6. At a time of next driving, the sleep induction device 1 reads the stimulation rate determined by the stimulation determination process from the storage unit 61, and applies contact stimulation according to the stimulation rate to the user U.

As described above, the sleep induction device 1 is attached to the skin of the user U by the adhesive 11, and is not easily detached or moved. Furthermore, the sleep induction device 1 is in close contact with the user U, and the sleeping posture is not likely to be prevented from being changed. Moreover, the impact generated by the drive device 20 is propagated to the entire attachment unit 10, and the sleep induction device 1 is able to apply soft contact stimulation of as if tapping with a palm of a hand to the body trunk of the user U or a part close to the body trunk. The user U may receive from the sleep induction device 1, contact stimulation simulating tapping that is applied to a back of a baby to put the baby to sleep.

Furthermore, the sleep induction device 1 may apply cyclical contact stimulation that is more suitable for the user U for sleep induction. The user U may feel the contact stimulation at a slow, regular rhythm of the sleep induction device 1, and breathing is unconsciously adjusted to the rhythm and sleep is induced.

That is, the sleep induction device 1 is a respiratory rhythm adjustment device for adjusting a respiratory rhythm of the user U. The respiratory rhythm adjustment device includes the attachment unit 10 and the drive device 20. The attachment unit 10 is attached to the user U. The drive device 20 includes the control unit 60 for cyclically outputting a drive signal that is according to the stimulation information stored in the storage unit 61, the stimulation application unit 70 for generating stimulation according to the drive signal and for applying the stimulation to the user U, and the battery 50 for supplying power to the control unit 60 and the stimulation application unit 70, and the drive device 20 is provided continuously to the attachment unit 10. The respiratory rhythm adjustment device may adjust the respiratory rhythm of the user U, and may promote meditation or mental balance.

According to the embodiment, the sleep induction device 1 may prevent detachment from the user U, is not likely to prevent change of the sleeping posture of the user U, and may apply cyclical contact stimulation at a stimulation rate that is suitable for the user U for sleep induction.

(First Modification)

Figure 6:
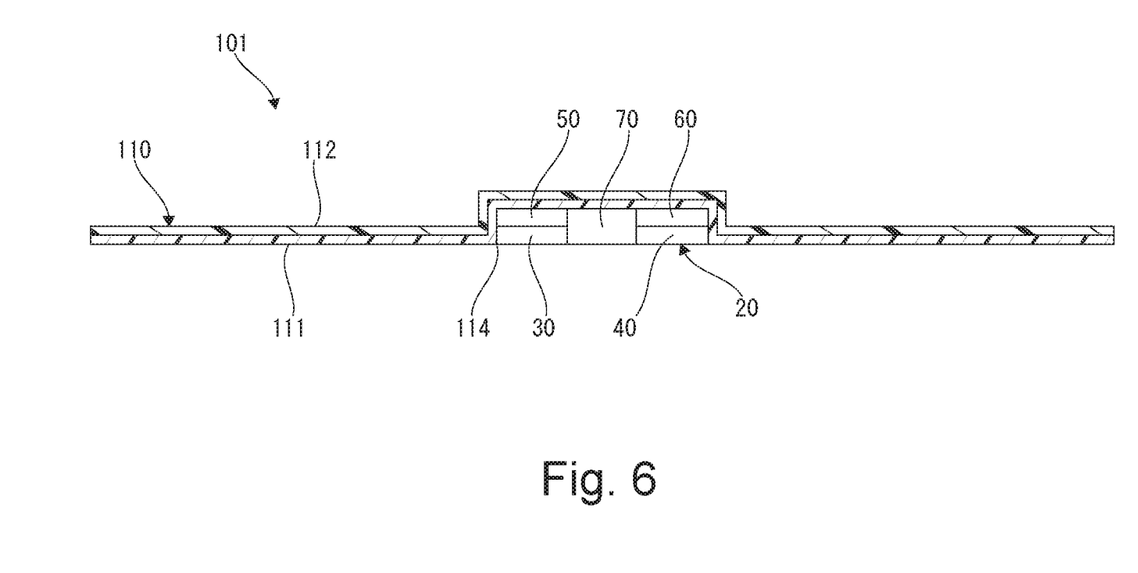
FIG. 6 is a cross-sectional view of a center portion of a sleep induction device according to a first modification of the first embodiment taken along a thickness direction.
Figure 7:
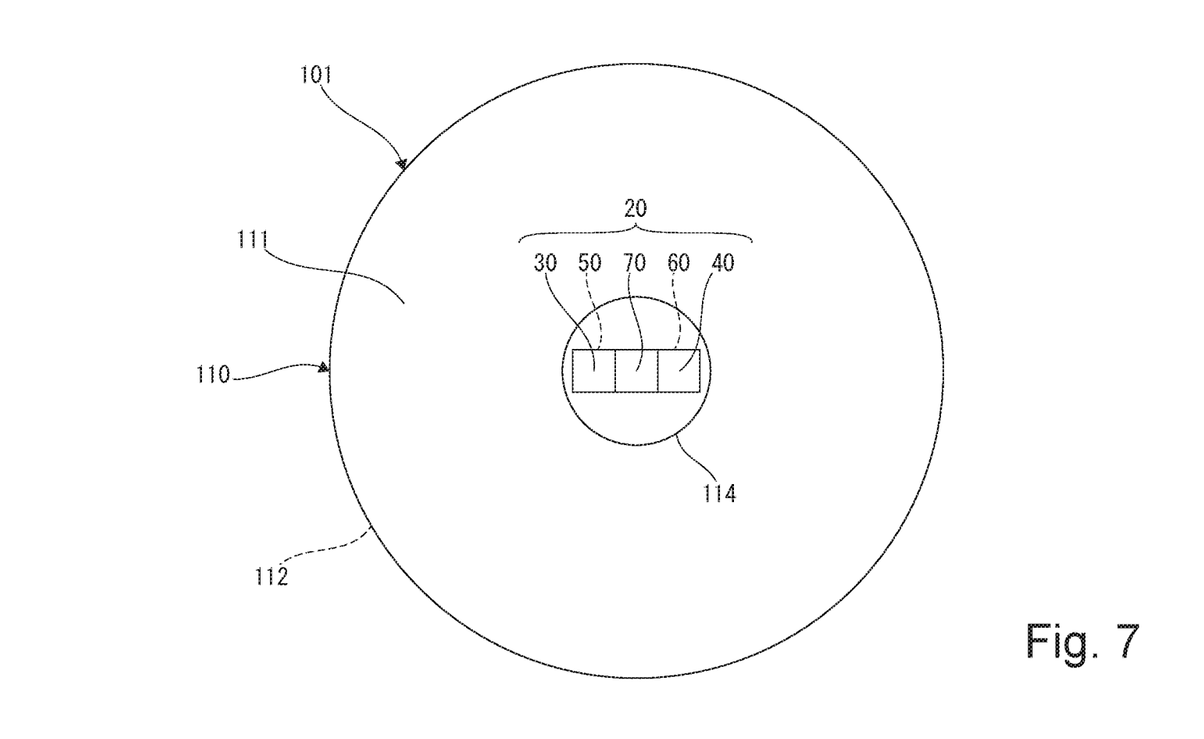
FIG. 7 is a bottom view showing an example of an external configuration of the sleep induction device according to the first modification of the first embodiment.

FIG. 6 is a cross-sectional view of a center portion of a sleep induction device 101 taken along a thickness direction. FIG. 7 is a bottom view showing an example of the sleep induction device 101 according to the first modification. In the description of the present modification, structures the same as those in the embodiment are denoted in the drawings by same reference signs, and description thereof is omitted. The same can be said for other embodiments and modifications.

In the embodiment, the attachment unit 10 includes the bag 12 and the filling member 13, but this is not restrictive. An attachment unit 110 may include a sheet 112 that is a third sheet formed from fabric.

The sleep induction device 101 includes the attachment unit 110. The attachment unit 110 includes an adhesive 111, the sheet 112, and a housing unit 114. The adhesive 111 is held on the sheet 112. The sheet 112 is formed from fabric such as non-woven fabric, woven fabric, or knitted fabric, for example. The sheet 112 has a circular outer periphery, but this is not restrictive (FIG. 7). The housing unit 114 is provided at a center of the sheet 112 in a recessed manner, and the housing unit 114 houses the drive device 20.

That is, the attachment unit 110 includes the third sheet and the adhesive 111 held on the third sheet, and is attached to skin by the adhesive 111 in a manner covering the drive device 20.

Second Modification

Figure 8:
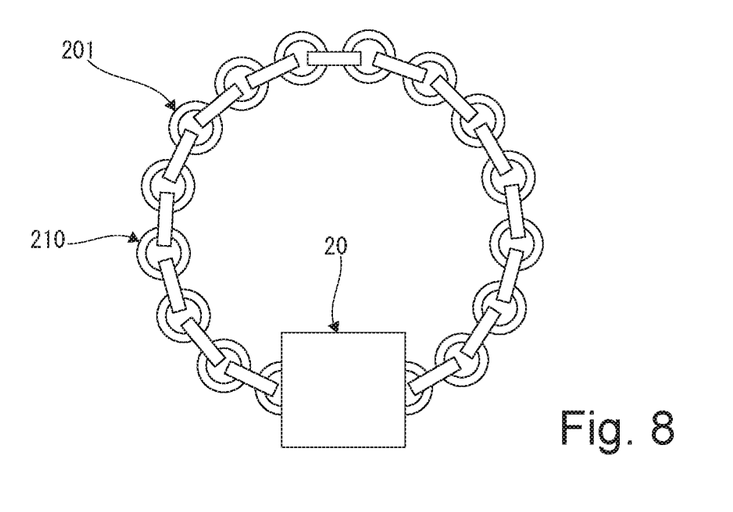
FIG. 8 is an explanatory diagram for describing an example of an external configuration of a sleep induction device according to a second modification of the first embodiment.

FIG. 8 is an explanatory diagram for describing an example of an external configuration of a sleep induction device 201 according to a second modification.

In the embodiment, the attachment unit 10 includes the bag 12 and the filling member 13, and in the first modification, the attachment unit 110 includes the sheet 112, but this is not restrictive.

An attachment unit 210 is an annular body to be attached around a neck of the user U to allow the drive device 20 to be hung while being in contact with the skin, for example. The annular body is a chain, for example.

Furthermore, the annular body may be attached not only around the neck, but also around a finger, a wrist, an ankle, a waist or the like of the user U. Moreover, the annular body may be a member such as a strip plate, a bar, a string or the like, instead of being a chain. Moreover, the annular body may be a watch, an anklet, a wristband, or a pendant, for example.

That is, the attachment unit 210 is an annular body to be attached to a part of a body of the user U.

(Third Modification)

Figure 9:
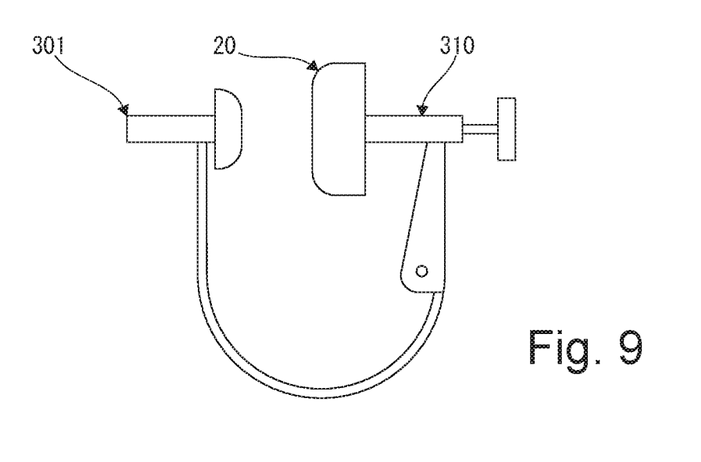
FIG. 9 is an explanatory diagram for describing an example of an external configuration of a sleep induction device according to a third modification of the first embodiment.

FIG. 9 is an explanatory diagram for describing an example of an external configuration of a sleep induction device 301 according to a third modification.

In the embodiment, the attachment unit 10 includes the bag 12 and the filling member 13, and in the first modification, the attachment unit 110 includes the sheet 112, and in the second modification, the attachment unit 210 is an annular body, but this is not restrictive.

For example, an attachment unit 310 is a clip to be attached to an earlobe of the user U. That is, the attachment unit 310 is a clip that sandwiches a part of the body of the user U.

Furthermore, the attachment unit 310 may be a hook to be attached to a part of the body of the user U, such as the earlobe.

(Fourth Modification)

In the embodiment and the modifications, the instruction to start driving is input to the control unit 60 through the operation unit 30, but the instruction to start driving may alternatively be input to the control unit 60 through a terminal device 401.

The control unit 60 includes a wireless communication unit 62 (a dash-dot-dotted line in FIG. 3). The wireless communication unit 62 is connected to an external terminal device 401 such as a personal digital assistant through wireless communication. The terminal device 401 includes a touch panel and a display screen. When the user U operates the touch panel and inputs the instruction to start driving to the terminal device 401, the terminal device 401 outputs the instruction to start driving to the wireless communication unit 62, and in response, the control unit 60 starts the stimulation determination process.

Furthermore, instructions regarding the stimulation rate, the drive time, and stimulation intensity may be input to the control unit 60 through the terminal device 401. The wireless communication unit 62 provided in the control unit 60 performs wireless communication with the external terminal device 401 to receive input of each of instructions regarding the stimulation rate, drive start, the drive time, and the stimulation intensity from the terminal device 401, and outputs the input instructions to the control unit 60 (a dash-dot-dotted line in FIG. 3).

(Fifth Modification)

In the embodiment and the modifications, the operation unit 30 includes a push button, but the operation unit 30 may alternatively include a dial for inputting each of instructions regarding the stimulation rate, drive start, the drive time, and the stimulation intensity.

Furthermore, the operation unit 30 may include a slider in addition to or instead of the dial.

(Sixth Modification)

The drive device 20 may include a warming mechanism 601 so that sleep induction may be promoted in the user U by warming (a dash-dot-dotted line in FIG. 3). That is, the warming mechanism 601 receives supply of power from the battery 50, and is driven by a drive instruction from the control unit 60 to warm the user U.

(Seventh Modification)

In the embodiment and the modifications, the storage unit 61 is provided in the control unit 60, but the storage unit 61 may alternatively be provided in the terminal device 401 or a server 701 connected to the terminal device 401 (a dash-dot-dotted line in FIG. 3).

The server 701 is capable of acquiring the stimulation rate from each terminal device 401, aggregating or analyzing the stimulation rate, calculating a more optimal stimulation rate, and outputting a calculation result to the control unit 60 via the terminal device 401. The control unit 60 may output the drive signal according to the more optimal stimulation rate input from the server 701.

(Eighth Modification)

In the embodiment and the modifications, the stimulation application unit 70 applies contact stimulation to the user U, but the stimulation application unit 70 may alternatively apply electrical stimulation to the user U. That is, the stimulation application unit 70 includes an electrode 801, and the electrode 801 applies electrical stimulation generated according to the drive signal, to the user U.

Second Embodiment

In the first embodiment and the modifications, an example is described where the stimulation determination unit P2 determines the stimulation rate of contact stimulation, but the stimulation determination unit P2 may alternatively determine contact stimulation according to a stimulation part of the user U.

Figure 10:
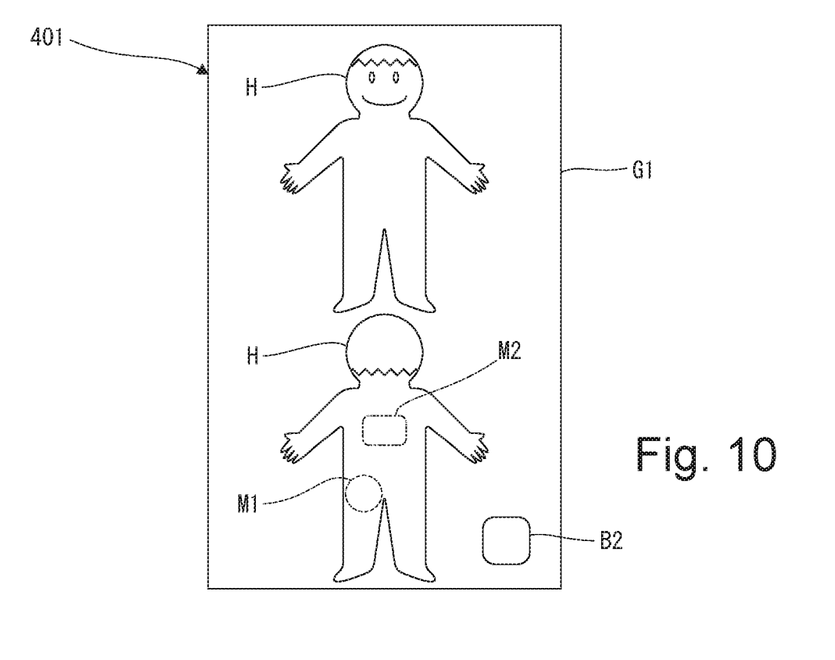
FIG. 10 is a diagram showing an example of an instruction input screen displayed by a terminal device of a sleep induction device according to a second embodiment.
Figure 11:
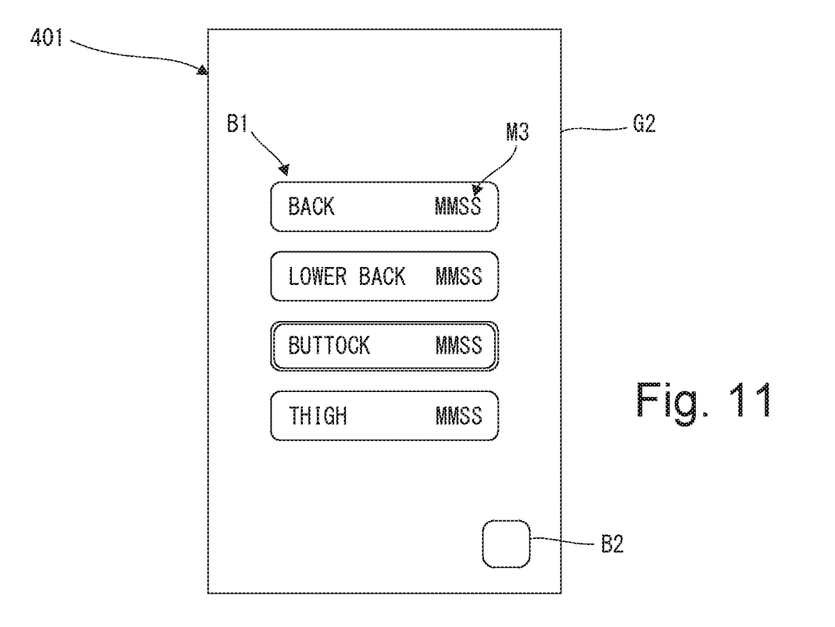
FIG. 11 is a diagram showing an example of the instruction input screen displayed by the terminal device of the sleep induction device according to the second embodiment.

FIGS. 10 and 11 are diagrams each showing an example of an instruction input screen G1 displayed by the terminal device 401 of the sleep induction device 1 according to a second embodiment. In FIG. 11, MM indicates "minutes", and SS indicates "seconds".

In the present embodiment, an instruction regarding a stimulation part may be input through the terminal device 401. The stimulation part is a back, a lower back, a buttock, or a thigh, for example. The stimulation part is not limited to those listed above, and may also be other parts. For example, the stimulation part may be an arm, an ankle, an ear, or the like.

As shown in FIG. 10, when the user U inputs an instruction, the instruction input screen G1 showing a human body image H, such as a front side of a human body and a back side of the human body, is displayed on the terminal device 401. When the user U taps on a part of the human body on the instruction input screen G1 with a finger, the terminal device 401 displays a mark image M1 (a dashed line in FIG. 10) at a tapped position, and outputs the stimulation part associated with the tapped position to the control unit 60. In the example in FIG. 10, the mark image M1 is displayed on a buttock.

As shown in FIG. 11, the terminal device 401 is also capable of displaying an instruction input screen G2 showing instruction buttons B1. When the user U taps on an instruction button B1, the terminal device 401 places the instruction button B1 that is tapped in a selected state, and outputs the stimulation part associated with the tapped position to the control unit 60. In the example in FIG. 11, the instruction buttons B1 showing words "back", "lower back", "buttock" indicating a buttock, and "thigh" indicating a thigh are displayed on the instruction input screen G2, and among these, the instruction button B1 indicating "buttock" is in the selected state.

The instruction input screens G1, G2 also include a proposal button B2. When the user U taps on the proposal button B2, the control unit 60 performs the stimulation determination process by a stimulation proposal unit P3 (a dash-dot-dotted line in FIG. 3) described later, and displays a proposal image M2 (a dash-dotted line in FIG. 10) on the instruction input screen G1 and displays estimated sleep induction times M3 on the instruction input screen G2.

The storage unit 61 stores a program of the stimulation proposal unit P3, in addition to the drive unit P1 and the stimulation determination unit P2. Furthermore, the storage unit 61 stores a stimulation part, and a stimulation rate and a sleep induction time that are associated with the stimulation part, and history information about the stimulation part, the stimulation rate, and the sleep induction time. In an initial state, initial values are set as the stimulation rate and the sleep induction time.

In response to input of an instruction from the user U, the drive unit P1 reads the stimulation rate that is associated with a stimulation part from the storage unit 61, and drives the stimulation application unit 70 by cyclically outputting the drive signal that is according to the stimulation rate.

The stimulation determination unit P2 reads the stimulation rate that is associated with the stimulation part from the storage unit 61, calculates a stimulation candidate by making a shift in the stimulation rate by a predetermined amount, outputs the drive signal according to the stimulation candidate, acquires the detection time from start of output of the drive signal to detection of sleep onset by the sensor 40, and causes the storage unit 61 to store the stimulation candidate and the detection time as the stimulation rate and the sleep induction time, in association with the stimulation part, when the detection time is shorter than the sleep induction time that is associated with the stimulation part.

The stimulation proposal unit P3 reads the stimulation part and the sleep induction time that is associated with the stimulation part from the storage unit 61, calculates the estimated sleep induction time M3, and makes a proposal to the user U about a stimulation part with a high sleep induction effect based on the estimated sleep induction time M3.

Next, the stimulation determination process in the second embodiment will be described.

Figure 12:
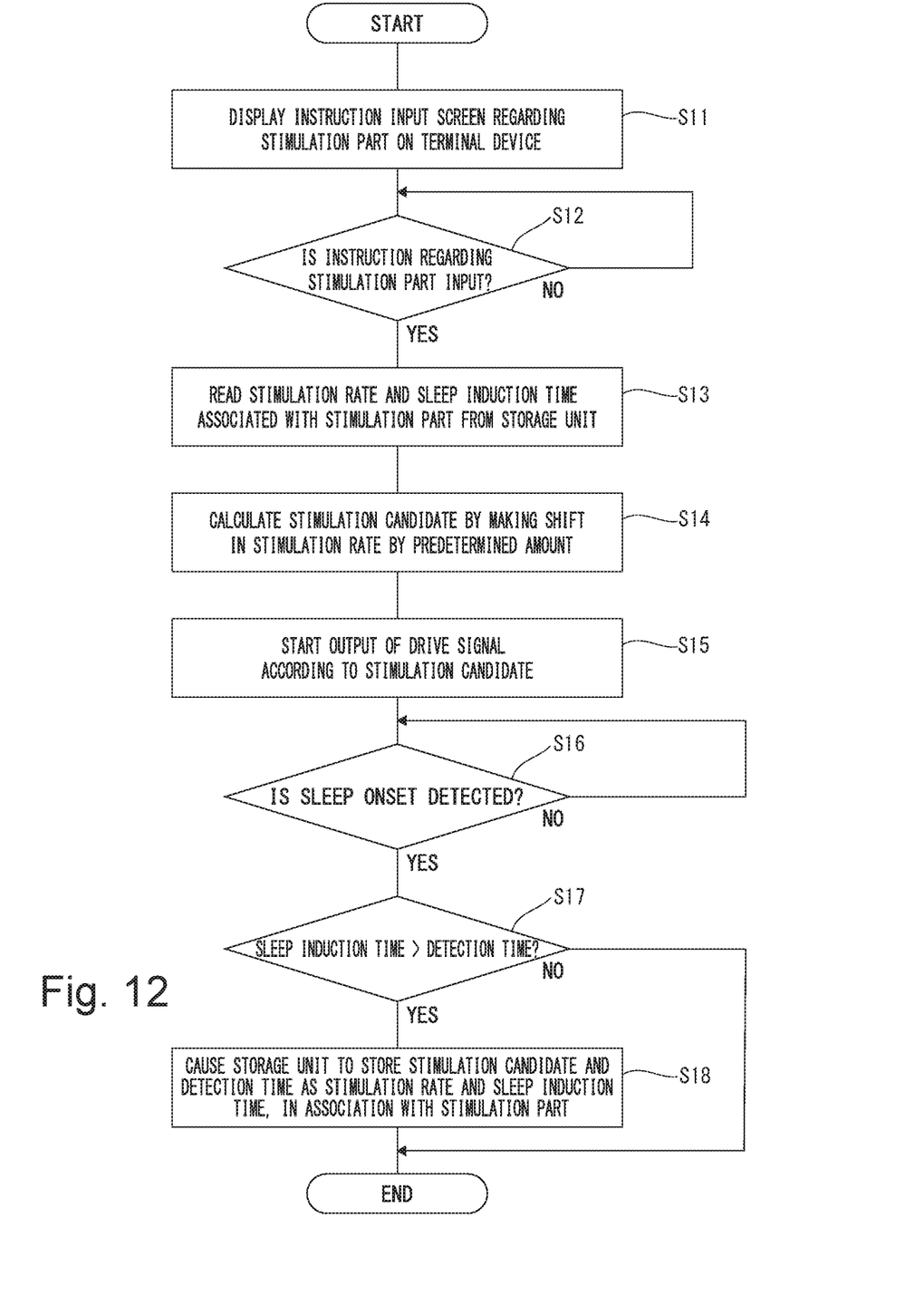
FIG. 12 is a flowchart showing an example of a flow of a stimulation determination process by the sleep induction device according to the second embodiment.

FIG. 12 is a flowchart showing an example of a flow of the stimulation determination process by the sleep induction device 1 according to the second embodiment.

When there is an input of an instruction to start driving, the control unit 60 displays, on the terminal device 401, the instruction input screen G1 for inputting an instruction regarding the stimulation part (S11). The control unit 60 may switch the instruction input screen G1 to the instruction input screen G2 in response to input of an instruction from the user U.

The control unit 60 waits until an instruction regarding the stimulation part is input through the instruction input screen G1, G2 (S12: NO). When the instruction is input (S12: YES), the process proceeds to S13. After inputting the instruction, the user U attaches the sleep induction device 1 to the contact part associated with the instruction that is input.

The control unit 60 reads, from the storage unit 61, the stimulation rate and the sleep induction time that are associated with the stimulation part associated with the instruction that is input in S12 (S13).

Processes from S14 to S17 are the same as those in S2 to S5, and description thereof is omitted.

In S18, the control unit 60 causes the storage unit 61 to store the stimulation candidate and the detection time as the stimulation rate and the sleep induction time, in association with the stimulation part.

The sleep induction device 1 may thus apply contact stimulation at an optimal stimulation rate corresponding to the stimulation part, to the user U.

Next, a stimulation proposal process in the second embodiment will be described.

Figure 13:
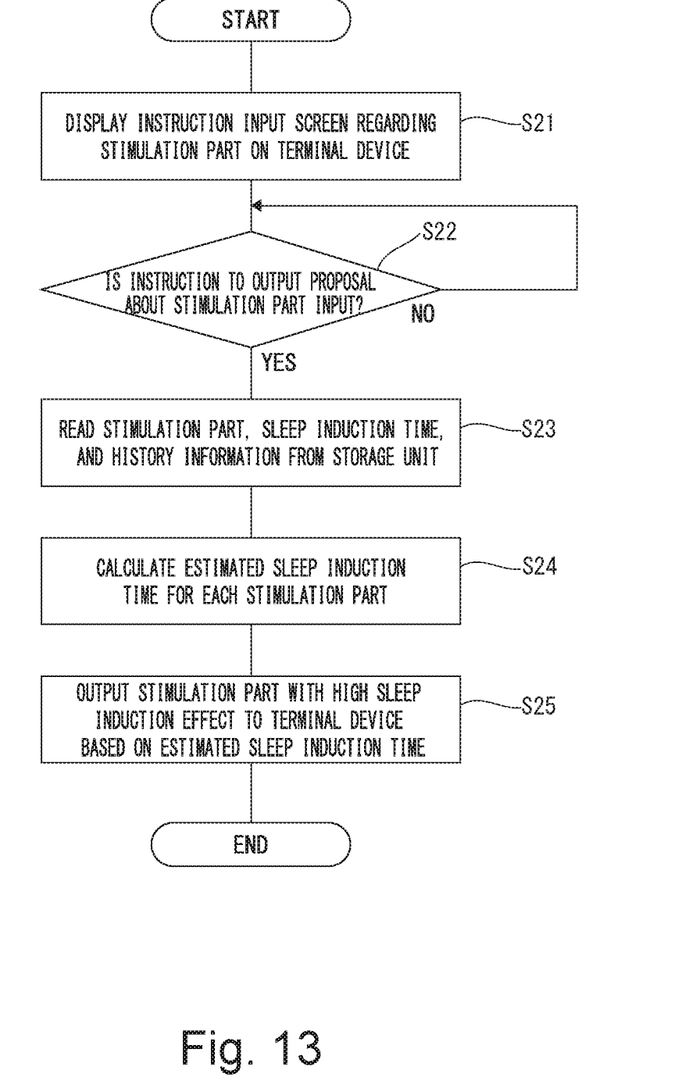
FIG. 13 is a flowchart showing an example of a flow of a stimulation part proposal process by the sleep induction device according to the second embodiment.

FIG. 13 is a flowchart showing an example of a flow of the stimulation part proposal process by the sleep induction device 1 according to the second embodiment.

A process in S21 is the same as the process in S11, and description thereof is omitted.

The control unit 60 waits until there is an input of an instruction to output a proposal about the stimulation part by the proposal button B2 (S22: NO). When there is an input of the instruction (S22: YES), the process proceeds to S23.

The control unit 60 reads the history information about the stimulation part and the sleep induction time from the storage unit 61 (S23).

The control unit 60 performs predetermined calculation based on the history information, and calculates the estimated sleep induction time M3 for each stimulation part (S24). The predetermined calculation is, but not limited to, calculation of an average of the sleep induction times based on the history information, for example.

The control unit 60 outputs the stimulation part with a high sleep induction effect to the terminal device 401, based on the estimated sleep induction time M3 (S25). The stimulation part with a high sleep induction effect is a stimulation part where the estimated sleep induction time M3 calculated in S24 is shortest, for example. The proposal image M2 is displayed on the instruction input screen G1 of the terminal device 401, and the estimated sleep induction time M3 is displayed on the instruction input screen G2.

The sleep induction device 1 may thus make a proposal about the stimulation part that is more suitable for sleep induction, to the user U.

That is, the terminal device 401 is an instruction input device. Furthermore, the sleep induction device 1 is a respiratory rhythm adjustment device for adjusting a respiratory rhythm of the user U.

The respiratory rhythm adjustment device includes the instruction input device to which the user U inputs an instruction regarding a desired stimulation part, the attachment unit 10 for being attached to the stimulation part of the user U, and the drive device 20 provided continuously to the attachment unit 10 and including the control unit 60 for reading the stimulation rate that is associated with the stimulation part from the storage unit 61 and for cyclically outputting the drive signal that is according to the stimulation rate, the stimulation application unit 70 for generating stimulation according to the drive signal and for applying the stimulation to the user U, and the sensor 40 for detecting sleep onset in the user U, where the storage unit 61 stores the stimulation part, and the stimulation rate and the sleep induction time that are associated with the stimulation part, and the control unit 60 reads the stimulation rate that is associated with the stimulation part from the storage unit 61, calculates the stimulation candidate by making a shift in the stimulation rate by a predetermined amount, outputs the drive signal according to the stimulation candidate, acquires the detection time from start of output of the drive signal to detection of sleep onset by the sensor 40, and causes the storage unit 61 to store the stimulation candidate and the detection time as the stimulation rate and the sleep induction time, in association with the stimulation part, when the detection time is shorter than the sleep induction time.

Furthermore, the respiratory rhythm adjustment device reads the history information about the stimulation part and the sleep induction time from the storage unit 61, performs the predetermined calculation based on the history information, and calculates the estimated sleep induction time M3 for each stimulation part.

Furthermore, an operation method of the respiratory rhythm adjustment device is an operation method of the respiratory rhythm adjustment device including the instruction input device for allowing the user U to input an instruction regarding a desired stimulation part, the attachment unit 10 for being attached to the stimulation part of the user U, and the drive device 20 provided continuously to the attachment unit 10 and including the control unit 60 for reading the stimulation rate that is associated with the stimulation part from the storage unit 61 and for cyclically outputting the drive signal that is according to the stimulation rate, the stimulation application unit 70 for generating stimulation according to the drive signal and for applying the stimulation to the user U, and the sensor 40 for detecting sleep onset in the user U, where the storage unit 61 stores the stimulation part, and the stimulation rate and the sleep induction time that are associated with the stimulation part, and the control unit 60 reads the stimulation rate that is associated with the stimulation part from the storage unit 61, calculates the stimulation candidate by making a shift in the stimulation rate by a predetermined amount, outputs the drive signal according to the stimulation candidate, acquires the detection time from start of output of the drive signal to detection of sleep onset by the sensor 40, and causes the storage unit 61 to store the stimulation candidate and the detection time as the stimulation rate and the sleep induction time, in association with the stimulation part, when the detection time is shorter than the sleep induction time.

Furthermore, a respiratory rhythm adjustment program causes a computer to execute a program for causing the user U to input an instruction regarding a desired stimulation part, a program for reading the stimulation rate that is associated with the stimulation part from the storage unit 61, for calculating the stimulation candidate by making a shift in the stimulation rate by a predetermined amount, and for outputting the drive signal according to the stimulation candidate, a program for acquiring the detection time from start of output of the drive signal to detection of sleep onset by the sensor 40, and a program for causing the storage unit 61 to store the stimulation candidate and the detection time as the stimulation rate and the sleep induction time, in association with the stimulation part, when the detection time is shorter than the sleep induction time.

The user U may thus select the stimulation part according to preference, and may receive contact stimulation from the sleep induction device 1 at a more optimal stimulation rate according to the stimulation part that is selected. Furthermore, the user U may select a more optimal stimulation part by referring to the proposal image M2 (the dash-dotted line in FIG. 10), and may receive contact stimulation from the sleep induction device 1.

According to the embodiment, the sleep induction device 1 may prevent detachment from the user U, is not likely to prevent change of the sleeping posture of the user U, and may apply cyclical stimulation suitable for the user U, at a stimulation part with a high sleep induction effect selected from a plurality of stimulation parts.

Modification of Second Embodiment

In the embodiments and the modifications, an example is described where the stimulation information is the stimulation rate, but the stimulation information may alternatively be stimulation intensity or both of the stimulation rate and the stimulation intensity.

In the present modification, the storage unit 61 stores the stimulation part, the stimulation intensity, the stimulation rate and the sleep induction time that are associated with the stimulation part, and history information about the stimulation part, the stimulation intensity, the stimulation rate and the sleep induction time.

The stimulation determination unit P2 reads the stimulation intensity and the stimulation rate that are associated with the stimulation part from the storage unit 61, calculates the stimulation candidate by making a shift in the stimulation intensity and the stimulation rate by a predetermined amount, outputs the drive signal according to the stimulation candidate, acquires the detection time from start of output of the drive signal to detection of sleep onset by the sensor 40, and causes the storage unit 61 to store the stimulation candidate and the detection time as the stimulation intensity, the stimulation rate and the sleep induction time, in association with the stimulation part, when the detection time is shorter than the sleep induction time that is associated with the stimulation part.

The predetermined amount is constituted by constants defining the stimulation intensity and the stimulation rate, but the stimulation intensity may alternatively be defined by a function of the stimulation rate. For example, the stimulation intensity may be reduced or increased according to increase in the stimulation rate.

The user U may thus select the stimulation part according to preference, and may receive contact stimulation from the sleep induction device 1 at more optimal stimulation intensity and stimulation rate according to the stimulation part that is selected.

Additionally, in the embodiments and the modifications, the control unit 60 cyclically outputs the drive signal, but instead, the drive signal may be output in such a way that the stimulation intensity fluctuates in inverse proportion to frequency, for example.

Additionally, in the embodiments and the modifications, the sensor 40 is an optical pulse wave sensor, but this is not restrictive. The sensor 40 may detect sleep onset by measuring a pulse generated according to a cardiac cycle using a measurement electrode attached to the user U, or may detect sleep onset using a sound sensor, based on a sound generated by pulsing of heart, or may detect sleep onset using a sound sensor, based on a breathing sound during sleep.

Additionally, in the embodiments and the modifications, the attachment unit 10 has a round surface shape that is recessed to fit a shape of the buttock or the thigh, but the attachment unit 10 may have a shape that is continuously U-shaped in cross-section or may have a protruding round surface shape as long as the shape fits the attachment part of the user U.

Additionally, in the embodiments and the modifications, an example is described where the adhesives 11, 111 are silicon-based pressure-sensitive adhesives (PSAs), but instead, the adhesives 11, 111 may be rubber, acrylic or other types of adhesives. Furthermore, the adhesive may be formed on the bag 12 or the sheet 112 through application or spraying or by being taped, for example.

Additionally, in the embodiments and the modifications, the control unit 60 includes a control device and the storage unit 61, but instead, the control unit 60 may include a field programmable gate array (FPGA), a programmable logic device (PLD), an application specific integrated circuit (ASIC), or an integrated circuit formed by another technique, and the functions may be implemented by the integrated circuit, or the functions may be implemented by an electric circuit.

Additionally, in the embodiments and the modifications, the stimulation application unit 70 generates stimulation by sucking the plunger 74 by excitation of the coil 72, but this is not restrictive. For example, the stimulation application unit 70 may apply stimulation to the impact plate 77 by swinging or rotating the impactor 76 by a motor, or may generate vibration by a vibration generator.

Additionally, the battery 50 in the embodiments and the modifications may be of a replacement type, or may be of a rechargeable type that is rechargeable through wired power supply or wireless power supply.

The present invention is not limited to the embodiments described above, and various changes and modifications may be made within the scope of the present invention without departing from the gist of the present invention.

According to the present invention, there may be provided a respiratory rhythm adjustment device, an operation method of the respiratory rhythm adjustment device, a computer readable recording medium, and a sleep induction device, according to which detachment from the user may be prevented, change of the sleeping posture of the user is not easily prevented, and cyclical stimulation more suitable for the user may be applied.

What is claimed is:

1. A sleep induction device comprising:
    an instruction input device for allowing a user to input an instruction regarding a stimulation part that is desired;
    an attachment unit for being attached to the stimulation part of the user; and
    a drive device provided continuously to the attachment unit and including a control unit for reading a stimulation rate that is associated with the stimulation part from a storage unit and for cyclically outputting a drive signal that is according to the stimulation rate, a stimulation application unit for generating stimulation according to the drive signal and for applying the stimulation to the user, and a sensor for detecting sleep onset in the user, wherein
    the storage unit stores the stimulation part, and the stimulation rate and a sleep induction time that are associated with the stimulation part, and
    the control unit reads the stimulation rate that is associated with the stimulation part from the storage unit, calculates a stimulation candidate by making a shift in the stimulation rate by a predetermined amount, outputs the drive signal according to the stimulation candidate, acquires a detection time from start of output of the drive signal to detection of the sleep onset by the sensor, and causes the storage unit to store the stimulation candidate and the detection time as the stimulation rate and the sleep induction time, in association with the stimulation part, when the detection time is shorter than the sleep induction time.

2. The sleep induction device according to claim 1, wherein the control unit reads history information about the stimulation part and the sleep induction time from the storage unit, performs predetermined calculation based on the history information, and outputs an estimated sleep induction time for each stimulation part.

* * * * *